(12) United States Patent
Taniguchi et al.

(10) Patent No.: US 7,868,351 B2
(45) Date of Patent: Jan. 11, 2011

(54) LIGHT EMITTING DEVICE

(75) Inventors: Reiko Taniguchi, Osaka (JP); Masayuki Ono, Osaka (JP); Shogo Nasu, Hyogo (JP); Eiichi Satoh, Osaka (JP); Masaru Odagiri, Hyogo (JP)

(73) Assignee: Panasonic Corporation, Osaka (JP)

( * ) Notice: Subject to any disclaimer, the term of this patent is extended or adjusted under 35 U.S.C. 154(b) by 491 days.

(21) Appl. No.: 12/058,374

(22) Filed: Mar. 28, 2008

(65) Prior Publication Data

US 2008/0237623 A1    Oct. 2, 2008

(30) Foreign Application Priority Data

Mar. 28, 2007    (JP)    ............... 2007-083638

(51) Int. Cl.
*H01L 33/08* (2010.01)

(52) U.S. Cl. ............... 257/103; 257/E33.012

(58) Field of Classification Search ............ 257/103, 257/E33.012
See application file for complete search history.

(56) References Cited

FOREIGN PATENT DOCUMENTS

| JP | 2002-067000 | 3/2002 |
|----|-------------|--------|
| JP | 3409126 | 3/2003 |
| JP | 20006-120328 | 5/2006 |

OTHER PUBLICATIONS

Terabe, K., et al., "Quantized conductance atomic switch", Nature, Jan. 6, 2005, pp. 47-50, vol. 433, Nature Publishing Group.
Fischer, A. "Electroluminescent Lines in ZnS Powder Particles", Journal of the Electrochemical Society, Nov. 1962, pp. 1043-1049, vol. 109 No. 11.

*Primary Examiner*—Evan Pert
(74) *Attorney, Agent, or Firm*—McDermott Will & Emery LLP

(57) ABSTRACT

A light emitting device includes a pair of electrodes, wherein at least one electrode is transparent or semi-transparent, and an phosphor layer provided between the pair of electrodes, wherein the phosphor layer includes a layer having nitride semiconductor particles, and wherein the nitride semiconductor particles have metal nano structures precipitated in grain boundaries between the nitride semiconductor particles.

6 Claims, 2 Drawing Sheets

*Fig.1*
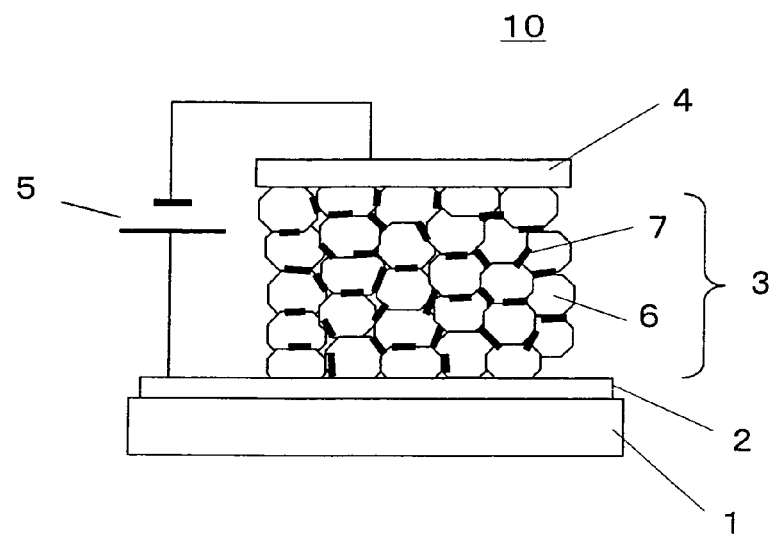
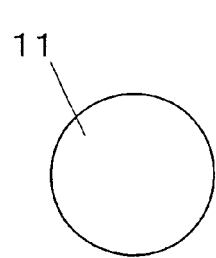
*Fig.2A*
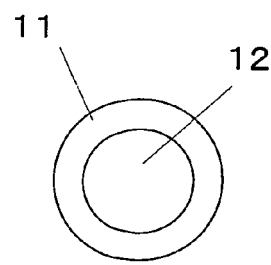
*Fig.2B*
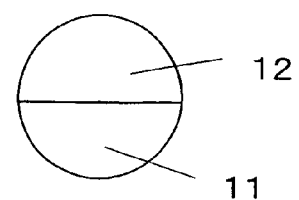
*Fig.2C*

LIGHT EMITTING DEVICE

This application is based on Japanese patent application No. 2007-83638 filed in Japan on Mar. 28, 2007, the content of which are hereby incorporated by reference.

BACKGROUND OF THE INVENTION

1. Field of the Invention

The present invention relates to an electroluminescent (EL) device including a phosphor layer having nitride semiconductor particles.

2. Description of the Related Art

A GaN-based nitride semiconductor has excellent characteristics as light emitting materials and an LED and laser including a single crystal thin layer, have become commercially practical. However, it is difficult to apply the single crystal thin layer to a light emitting device with a large area. On the other hand, as for the nitride semiconductor, various methods of preparing particles are proposed and applications to a light emitting device are expected. As a light emitting device using the nitride semiconductor particle, application to a dispersion type electroluminescent device is expected.

FIG. 4 is a schematic sectional view showing a constitution of a typical dispersion type direct current electroluminescent device 50. This dispersion type direct current electroluminescent device 50 has a transparent electrode 52, a phosphor layer 53 and a rear surface electrode 54, which are stacked in turn on a substrate 51. In the phosphor layer 53, luminescent particles 56 are dispersed in an organic binder 59. The luminescent particles 56 includes, for example, a ZnS:Mn luminescent coated with $Cu_xS$. The transparent electrode 52 and the rear surface electrode 54 are electrically connected to a direct current power source 55. When a voltage is applied from the power source 55 between the transparent electrode 52 and the rear surface electrode 54, the luminescent particles 56 in the phosphor layer 53 are caused to emit light. The light passes through the transparent electrode 52 and the substrate 51, and the light is guided from the light emitting device 50, as disclosed in A. G. Fischer, J. Electrochem. Soc., 109, 1043, 1962.

It is known that the nitride semiconductor emits light by recombination of an electron and a hole. In order to improve luminous efficiency, it is necessary to inject these charges such as electrons and holes into the semiconductor particles with efficiency. Therefore, when the nitride semiconductor particle is applied to a dispersion type electroluminescent structure, it is desirable that the nitride semiconductor particles are filled leaving no space between particles as far as possible and charges from the electrode are efficiently transferred and charges are efficiently injected into the particle.

However, in the nitride semiconductor particle, there is a problem that many non-radiative recombination centers are present in the grain boundaries between the particles and charges come to these centers are trapped in the non-radiative recombination centers to interfere with the charge injection into the particle. Therefore, a means for improving the efficiency of charge injection into the particle becomes essential.

SUMMARY OF THE INVENTION

Accordingly, it is an object of the present invention to provide a light emitting device which can efficiently inject charges such as electrons and holes into the nitride semiconductor particles including a phosphor layer.

The light emitting device of the present invention includes a pair of electrodes, wherein at least one electrode is transparent or semi-transparent; and a phosphor layer provided between the pair of electrodes, wherein the phosphor layer includes a layer having nitride semiconductor particles and wherein the nitride semiconductor particles have metal nano-structures precipitated in grain boundaries between the nitride semiconductor particles.

Further, the nitride semiconductor particle may contain at least one element of Ga, Al and In. Furthermore, the nitride semiconductor particle may contain at least one element selected from the group consisting of Li, Be, C, Mg, Si, Cr, Mn, Zn, Ce, Pr, Nd, Pm, Sm, Eu, Gd, Tb, Dy, Ho, Er, Tm, and Yb.

Further, the metal nano-structure may include nano particles each having nanometer size or nano wires each having nanometer length. The metal nano structure may have a silver nano-structure. The silver nano structure may be precipitated by irradiating an electron beam to sulfide of silver.

According to the present invention, plane emission with high luminance and high efficiency can be realized and a light emitting device using a nitride semiconductor can be realized to enable enlargement of an area. That is, in the light emitting device of the present invention, by coating the nitride semiconductor particles dispersed in the phosphor layer with a metal ion carrier and irradiating an electron beam to the coated nitride semiconductor particles, the metal nano-structures are precipitated in the grain boundaries between nitride semiconductor particles. Thereby, the resistance in the grain boundary can be reduced and the efficiency of charge injection into the particles can be improved. Further, since precipitated metal forms a nano structure, it can be expected that the intensity of electric field in a nano structure is enhanced and the efficiency of charge injection into the semiconductor particle is dramatically increased.

BRIEF DESCRIPTION OF THE DRAWINGS

Various objects, features and advantages of the present invention will become clear from preferred embodiments described below with reference to the accompanying drawings:

FIG. 1 is a schematic sectional view showing a constitution of a light emitting device of the first embodiment of the present invention;

FIGS. 2A to 2C are sectional views showing examples of minute structures of nitride semiconductor particles composing a phosphor layer shown in FIG. 1;

DETAILED DESCRIPTION OF THE PREFERRED EMBODIMENTS

Figure 3:
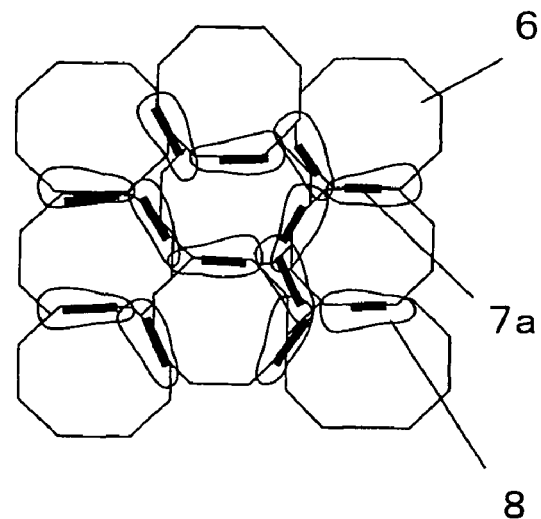
FIG. 3 is a schematic view showing a detailed constitution of a phosphor layer of first embodiment of the present invention.
Figure 4:
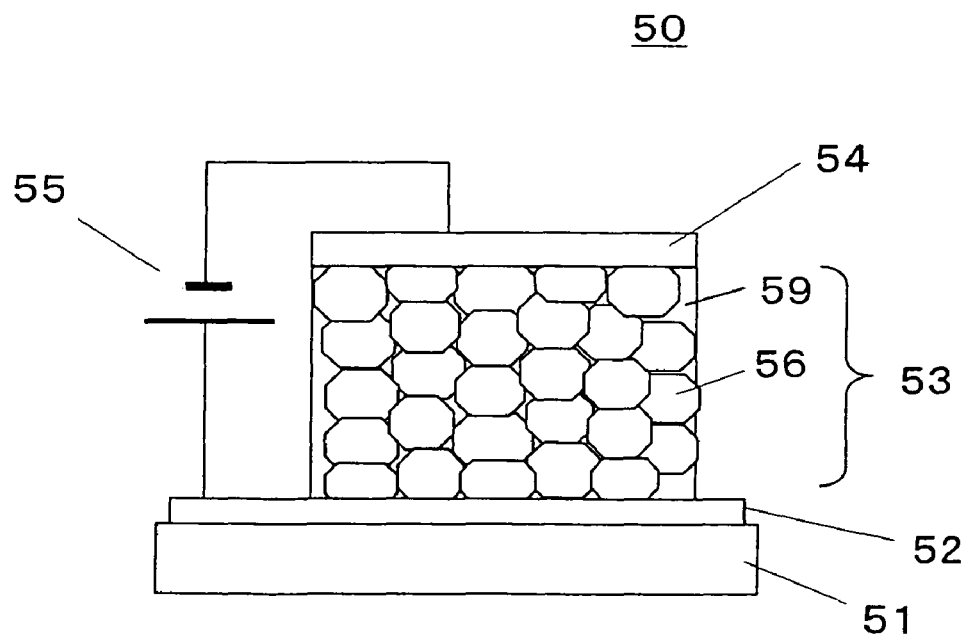
FIG. 4 is a schematic sectional view showing a constitution of a conventional dispersion type electroluminescent device.

Hereinafter, light emitting devices of the embodiment of the present invention will be described by use of accompanying drawings. In addition, in drawings, substantially like members in accompanying drawings are denoted by like reference symbols.

First Embodiment

<Schematic Constitution of Electroluminescent Device>

FIG. 1 is a schematic sectional view showing a constitution of a light emitting device 10 of this embodiment. This light emitting device 10 includes a phosphor layer 3 provided between a transparent electrode 2 of a first electrode and a rear surface electrode 4 of a second electrode. The phosphor layer 3 includes nitride semiconductor, for example, a plurality of nitride semiconductor particles 6 made of gallium nitride (GaN). Metal nano structures 7 with nanometer size such as a silver nano wire or a silver nano particle are precipitated in part of grain boundaries between nitride semiconductor particles 6. Further, a substrate 1 is provided adjacently on the transparent electrode 2 of a first electrode to support an entire electroluminescent device. The transparent electrode 2 and the rear surface electrode 4 are electrically connected to a power source 5. When a voltage is applied to the power source 5, holes are injected from the transparent electrode 2 connected to a positive electrode into the phosphor layer and electrons are injected from the rear surface electrode 4 connected to a negative electrode into the phosphor layer. The electrons and the holes injected into the phosphor layer 3 are further injected into the nitride semiconductor particles 6. The electrons and the holes are recombined in the particles 6 to emit light, and the light emission passes through the transparent electrode 2 and the substrate 1 and the light emission is guided from the light emitting device 10 to outside.

The light emitting device 10 of the first embodiment of the present invention has a feature of the precipitated metal nanostructures 7 such as a silver nano wire or the like in part of grain boundaries of nitride semiconductor particles 6 in the phosphor layer 3.

In a conventional structure, because non-radiative recombination occurs in the grain boundaries of the nitride semiconductor particles 6, light emission with high luminance cannot be expected.

As a method of inhibiting such as non-radiative recombination, there are, for example, a method of reducing resistance in an interface, and a method of inhibiting lattice defects which can become a non-radiative recombination center.

On the other hand, the present inventor has found that by realizing a structure in which the metal nano structures 7 are precipitated in boundaries of the above-mentioned nitride semiconductor particles 6, the non-radiative recombination in the grain boundary is reduced and property of injecting electrons into the nitride semiconductor particle is improved. These findings have now led to completion of the present invention. Thereby, luminous efficiency in the nitride semiconductor particles 6 is improved and a light emitting device to emit light with high luminance at a low voltage can be realized.

Next, each constituent member of this light emitting device 10 will be described.

<Substrate>

As the substrate 1, for example, a glass substrate, a ceramic substrate, a sapphire substrate, a boron nitride (BN) substrate, an aluminum nitride substrate, a gallium nitride substrate, an aluminum-gallium nitride substrate, an indium-gallium nitride substrate, a silicon carbide (SiC) substrate, a silicon (Si) substrate, and a metal substrate, and a plastic substrate, which is made of a polycarbonate resin, a polyethylene terephthalate resin, a polyester resin, an epoxy resin, an acrylic resin or an ABS (acrylonitrile-butadiene-styrene copolymer) resin, can be used.

In addition, in the case of a constitution in which light is not guided from a side of the substrate 1 to outside, the above-mentioned light-transmitting property is unnecessary and materials not having the light-transmitting property can be also employed.

<Electrode>

The electrodes include a transparent electrode 2 and a rear surface electrode 4. In these electrodes, an electrode on a side, from which light is emitted and guided, is provided as a transparent electrode 2 and an electrode on the other side is provided as a rear surface electrode 4. Material of the transparent electrode 2 on a side, from which light is emitted and guided, is limited based to pass the light. In addition, both electrodes may be transparent electrodes.

First, the transparent electrode 2 will be described. A material of the transparent electrode 2 may be a material having the light-transmitting property so that light emission can be guided from the phosphor layer 3 externally, and the material of the transparent electrode 2 preferably has a high transmittance particularly over the wavelengths in a visible light. This material preferably has low electric resistance as an electrode and further preferably has excellent adhesion to the substrate 1 and the phosphor layer 3. Examples of materials which are particularly suitable for the transparent electrode 2 include metal oxides, such as ITO (it is prepared by doping $SnO_2$ with $In_2O_3$, and also referred to as a indium tin oxide), InZnO, ZnO, and $SnO_2$, thin films of metals such as Pt, Au, Pd, Ag, Ni, Cu, Al, Ru, Rh, and Ir, and conductive polymers such as polyaniline, polypyrrole, PEDOT/PSS and polythiophene, but are not particularly limited to these materials. Films of these transparent electrodes 2 can be formed by a film formation method such as a sputtering method, an electron beam vapor deposition method, an ion plating method and the like for improving the transparency thereof or reducing the resistibility thereof. Further, a surface treatment such as a plasma treatment may be performed for controlling the resistibility after forming a film. A film thickness of the transparent electrode 2 is determined based on a required sheet resistance value and visible light transmittance.

A carrier concentration of the transparent electrode 2 is desirably in the range of 1E17 to 1E22 $cm^{-3}$. Further, in order to exert performance as the transparent electrode 2, it is desirable that the transparent electrode 2 has a volume resistivity of 1E-3 Ω·cm or less and a transmittance of 75% or more at a wavelength of 380 to 780 nm. It is good that a refractive index of the transparent electrode 2 is 1.85 to 1.95. Furthermore, when a film thickness of the transparent electrode 2 is 30 nm or less, a dense film having stable characteristics can be realized.

Next, the rear surface electrode 4 will be described. Any material can be applied to the rear surface electrode 4 as long as the material is a conductive material which is generally well known. The materials include, preferably for examples, metal oxides such as ITO, InZnO, ZnO and $SnO_2$, metals such as Pt, Au, Pd, Ag, Ni, Cu, Al, Ru, Rh, Ir, Cr, Mo, W, Ta and Nb and multilayer structures thereof, conductive polymers such as polyaniline, polypyrrole and PEDOT [poly(3,4-ethylenedioxythiophene)]/PSS [polystyrene sulfonic acid], and conductive carbon.

<Phosphor Layer>

The phosphor layer 3 includes a layer having nitride semiconductor particles 6. Further, the nitride semiconductor particles 6 has metal nano structures 7 precipitated in part of grain boundaries between the nitride semiconductor particles 6. In addition, the phosphor layer 3 includes the nitride semiconductor particles 6 and the metal nano-structures 7 precipitated in part of grain boundaries of the nitride semiconductor particles 6, but a metal compound used for precipitating the metal nano structures 7 may exist in part of grain boundaries.

<Nitride Semiconductor Particle>

Here, as a nitride semiconductor particle 6, GaN, AlN, InN or mix crystals (e.g., GaInN etc.) thereof can be employed. Further, the nitride semiconductor particle may contain one or more elements or ions selected from the group consisting of Li, Be, C, Mg, Si, Cr, Mn, Zn, Ce, Pr, Nd, Pm, Sm, Eu, Gd, Tb, Dy, Ho, Er, Tm, and Yb as an additive.

Furthermore, a minute structure of the nitride semiconductor particle 6 may have a structure among structures shown in FIGS. 2A, 2B, and 2C, namely a structure in which composition of the entire particle is homogeneous as shown in FIG. 2A, a structure in which a plurality of semiconductor materials are laminated in the form of two or more layers as shown in FIG. 2B, or a structure in which a plurality of semiconductor materials form a mixed crystal as shown in FIG. 2C.

<Metal Nano-structure>

The metal nano-structures 7 are precipitated in part of grain boundaries of the nitride semiconductor particles 6. The metal nano-structure 7 is preferably an electrically conductive metal such as silver, gold, platinum or the like. Further, the metal nano-structure 7 may be shaped like a particle of nano size or a nano wire with nano size. Further, this metal nano structures 7 are preferably precipitated in grain boundaries of particles simultaneously in or after forming a layer composed of the nitride semiconductor particles 6.

The present inventor was inspired by a literature (K. Terabe, et. al., Nature, 433, 47, 2005) and a patent document (Japanese Patent No. 3409126), and the inventor conceived an idea that the above-mentioned metal nano structures 7 are precipitated in part of grain boundaries of nitride semiconductor particles 6 in the phosphor layer 3. These findings have now led to completion of the present invention.

In addition, in accordance with the literature (K. Terabe, et. al., Nature, 433, 47, 2005), it was confirmed that when an electrode of sulfide of silver and an electrode of platinum are opposed to each other about one nanometer (nano means $10^{-9}$) apart, and a voltage is applied between these electrodes, a minute protrusion composed of about one billion silver atoms is extended or shortened from the electrode of sulfide of silver. Thereby, it is possible to pass or turn off an electric current. Further, in accordance with the patent document (Japanese Patent No. 3409126), it was confirmed that if electron beams are irradiated to the metal ion carrier, a metal ion is reduced by the electron beam to become metal and therefore a metal nano-wire and a metal nano-particle are formed.

The constitution of the present invention, not limited to the above-mentioned constitution, can be appropriately modified so that a plurality of phosphor layers 3 may be provided. A plurality of thin dielectric layers may be provided between the electrode and the phosphor layer to restrict an electric current. The light emitting device may be driven by an alternating power source. Also, a transparent electrode may be used for the rear surface electrode. A structure to seal all of or a part of the light emitting device 10 may be further provided. A color convert structure may be further placed on a light guide direction to convert the color of light emission from the phosphor layer 3.

First Example

Hereinafter, a method for producing the light emitting device 10 of first example of the first embodiment will be specifically described. In addition, a similar production method can also be employed for the above-mentioned phosphor layer made of another material.

(1) Corning 1737 was prepared as the substrate 1.
(2) ITO was deposited in a thickness of 1 μm on the substrate 1 as a transparent electrode 2 by a sputtering method.
(3) GaN particles 6 were deposited in a thickness of 1 μm on the resulting transparent electrode 2 by an AD method (aerosol deposition method).
(4) Sulfide of Silver ($Ag_2S$) (8) was deposited on the substrate 1 on which GaN particles 6 had been deposited to form a phosphor layer 3. Specifically, powder of $Ag_2S$ was charged into an evaporation source, and the $Ag_2S$ powder was irradiated with electron beams in a vacuum (of the order of $10^{-6}$ Torr) to deposit silver sulfide ($Ag_2S$) (8) on a layer composed of the GaN particles 6 by vapor deposition. This film was analyzed by an X-ray diffraction method and SEM (scanning electron microscope), and consequently found that a part of silver sulfide ($Ag_2S$) (8) was reduced and precipitated in the grain boundaries of the GaN particles 6 as Ag nano-wires 7a (FIG. 3).
(5) Subsequently, Pt was deposited in a thickness of 200 nm on the phosphor layer 3 by an electron beam vapor deposition method to form a rear surface electrode 4.

The light emitting device 10 of this first example was obtained by undergoing the above-mentioned process steps.

The transparent electrode 2 and the rear surface electrode 4 of this light emitting device 10 were connected to a direct current power source and light emission was evaluated. Consequently, the light emitting device 10 started to emit light at an applied voltage of 5 V and exhibited emission luminance of about 300 cd/m² at an applied voltage of 10 V.

In addition, film formation methods of the respective layers are not limited to the methods described above.

The light emitting device according to the present invention provides a display device which can achieve high-luminance display by low-voltage drive. The light emitting device of the present invention is particularly useful as a display device such as a digital camera, a car navigation system, a TV set and the like.

Although the present invention has been described in detail as related to the preferred embodiment as described above, the present invention is not limited to these and it is apparent to those skilled in the art that various alterations and modifications may be possible within a technical scope of the invention as set forth in the accompanying claims.

The invention claimed is:

1. A light emitting device comprising:
    a pair of electrodes, wherein at least one electrode is transparent or semi-transparent; and
    a phosphor layer provided between the pair of electrodes,
    wherein the phosphor layer includes a layer having nitride semiconductor particles and,
    wherein the nitride semiconductor particles have metal nano-structures precipitated in grain boundaries between the nitride semiconductor particles.

2. The light emitting device according to claim 1, wherein the nitride semiconductor particle contains at least one element of Ga, Al and In.

3. The light emitting device according to claim 1, wherein the nitride semiconductor particle contains at least one element selected from the group consisting of Li, Be, C, Mg, Si, Cr, Mn, Zn, Ce, Pr, Nd, Pm, Sm, Eu, Gd, Tb, Dy, Ho, Er, Tm, and Yb.

4. The light emitting device according to claim 1, wherein the metal-nano structure includes nano particles each having a nanometer size or nano wires each having a nanometer length.

5. The light emitting device according to claim 1, wherein the metal nano structure has a silver nano-structure.

6. The light emitting device according to claim 5, wherein the silver nano-structure is precipitated by irradiating electron beam to sulfide of silver.

* * * * *